US012601574B2

(12) United States Patent
Thornton

(10) Patent No.: US 12,601,574 B2
(45) Date of Patent: Apr. 14, 2026

(54) FOLDABLE MOVEABLE MEMBER FOR AN AIR VEHICLE WITH FOLD REGION HAVING A PLURALITY OF HOLES

(71) Applicant: MBDA UK LIMITED, Stevenage (GB)

(72) Inventor: Jeffrey Thornton, Hertfordshire (GB)

(73) Assignee: MBDA UK LIMITED, Stevenage (GB)

( * ) Notice: Subject to any disclaimer, the term of this patent is extended or adjusted under 35 U.S.C. 154(b) by 0 days.

(21) Appl. No.: 18/690,848

(22) PCT Filed: Sep. 9, 2022

(86) PCT No.: PCT/GB2022/052292
§ 371 (c)(1),
(2) Date: Mar. 11, 2024

(87) PCT Pub. No.: WO2023/037120
PCT Pub. Date: Mar. 16, 2023

(65) Prior Publication Data
US 2024/0400190 A1      Dec. 5, 2024

(30) Foreign Application Priority Data
Sep. 13, 2021    (GB) ..................................... 2113046

(51) Int. Cl.
*F42B 10/14* (2006.01)
*B64C 3/56* (2006.01)
(52) U.S. Cl.
CPC ................ *F42B 10/14* (2013.01); *B64C 3/56* (2013.01)

(58) Field of Classification Search
CPC . F42B 10/14; B64C 3/56; B64C 3/546; E05D 1/00; E05D 1/02; E05D 9/005
USPC .......................................................... 16/225
See application file for complete search history.

(56) References Cited

U.S. PATENT DOCUMENTS

| | | | |
|---|---|---|---|
| 2,874,401 A | 2/1959 | Kotkins | |
| 3,618,161 A | 11/1971 | Nozawa | |
| 3,842,463 A | 10/1974 | Wehner | |
| 4,158,447 A | 6/1979 | Humphries | |
| 2005/0151015 A1* | 7/2005 | Cagle ........................ | B64C 3/26 |
| | | | 244/121 |

(Continued)

FOREIGN PATENT DOCUMENTS

EP          3372490 A1     9/2018

OTHER PUBLICATIONS

Delimont, Isaac L., "Compliant Joints Suitable for Use as Surrogate Folds" (2014). Theses and Dissertations. 4231. Aug. 25, 2014. https://scholarsarchive.byu.edu/etd/4231 (Year: 2014).*

(Continued)

*Primary Examiner* — Arfan Y. Sinaki
(74) *Attorney, Agent, or Firm* — Day Pitney LLP; George Chaclas; Anthony A. Kassas

(57) ABSTRACT

A foldable moveable member for an air vehicle. The moveable member includes a sheet. The sheet has a first portion, a second portion, and a fold region. The first portion is connected to the second portion via the fold region, and the fold region comprises a plurality of holes such that the stiffness of the fold region is lower than the first or second portion. The fold region, the first portion, and the second portion form a continuous surface.

13 Claims, 18 Drawing Sheets

(56) References Cited

U.S. PATENT DOCUMENTS

| 2007/0138341 | A1* | 6/2007 | Joshi ...................... B63H 9/067 |
| | | | 244/129.1 |
| 2007/0199176 | A1* | 8/2007 | Mc Clellan .............. E05D 1/02 |
| | | | 16/224 |
| 2013/0216740 | A1* | 8/2013 | Russell-Clarke ...... B21D 31/04 |
| | | | 219/121.72 |
| 2015/0040349 | A1* | 2/2015 | Malia .................... B29C 70/345 |
| | | | 16/225 |
| 2016/0362918 | A1* | 12/2016 | Song ......................... E05D 1/00 |
| 2018/0257759 | A1* | 9/2018 | Etling ........................ B64C 9/18 |
| 2022/0002185 | A1* | 1/2022 | Ortner .................... B32B 17/10 |
| 2022/0198964 | A1* | 6/2022 | Cho ....................... G06F 1/1637 |
| 2024/0034671 | A1* | 2/2024 | Heiss-Chouquet ..... C03C 3/085 |

OTHER PUBLICATIONS

International Search Report and Written Opinion corresponding to Application No. PCT/GB2022/052292, dated Dec. 15, 2022, 11 pages.
GB Search Report corresponding to Application No. 2113046.3, dated Nov. 23, 2021, 1 page.
GB Exam Report corresponding to Application No. GB2404366.3, dated Nov. 2, 2025, 5 pages,.

* cited by examiner

300

(a)

FOLDABLE MOVEABLE MEMBER FOR AN AIR VEHICLE WITH FOLD REGION HAVING A PLURALITY OF HOLES

CROSS-REFERENCE TO RELATED APPLICATIONS

The present application is a U.S. National Stage Application of International Application No. PCT/GB2022/052292 filed Sep. 9, 2022 and published on Mar. 16, 2023 as WO2023/037120 A1, which claims benefit and priority of Great Britain Patent Application No. GB2113046.3 filed on Sep. 13, 2021, each of which is incorporated herein by reference in its entirety for any purpose whatsoever.

BACKGROUND OF THE DISCLOSURE

The present disclosure relates to a foldable moveable member for an air vehicle. The disclosure relates especially, but not exclusively, to foldable flight control members.

Flight control members on air vehicles guide the direction of the air vehicle, and/or assist with manoeuvring, whilst the air vehicle is in flight. Often, these flight control members protrude from the body or wings of the air vehicle. (In some applications, a wing may also be considered to be a flight control member.)

However, for some air vehicles, it is desirable to reduce the space that is taken up by the air vehicle while it is not in flight. For example, missiles are air vehicles that are typically launched from other air vehicles or from canisters, and there is often limited space for them in that other air vehicle or canister, or when the missile is being transported. Therefore some flight control members are designed to fold when not in use. An example of a foldable flight control member according to the prior art is shown in FIG. 1.

The flight control member is a fin 1 and has a first, top part 3 and a second part 5. The second part 5 is the base part of the fin 1 and is mounted via bolts 6 to an air vehicle (not shown).

The top part 3 is connected to the base part 5 via a hinge 7. In order to fold the top part 3, the top part 3 is rotated about the hinge 7, thus reducing the length of the space taken up by the fin 1.

The skilled person will appreciate that there is no continuous surface connecting the top part 3 to the base part 5, as there is always a discontinuity or gap within the hinge. This discontinuity has been found to increase the radar cross section of the air vehicle, by providing a return on an electromagnetic (EM) surface wave propagating on the surface of the fin 1.

The hinge 7 also protrudes from the surface of the fin 1, creating turbulence when the air vehicle is in flight and causing drag. Increased drag reduces the fuel/energy efficiency of the air vehicle. Increased turbulence also creates more noise, which is undesirable.

Thus the discontinuity reduces the survivability and performance of the air vehicle.

The present disclosure seeks to mitigate the above-mentioned problems. Alternatively or additionally, the present disclosure seeks to provide an improved foldable member for an air vehicle.

SUMMARY OF THE DISCLOSURE

The present disclosure provides, in a first aspect, a foldable moveable member having the features set out in claim 1 below.

The present disclosure provides, in a second aspect, a foldable flight control member having the features set out below.

The present disclosure provides, in a third aspect, an air vehicle having the features set out below.

The present disclosure provides, in a fourth aspect, a method having the features set out in below.

It will of course be appreciated that features described in relation to one aspect of the present disclosure may be incorporated into other aspects of the present disclosure. For example, features described in relation to the first aspect of the present disclosure may incorporate any of the features described with reference to the second aspect of the present disclosure, and vice versa.

DESCRIPTION OF THE DRAWINGS

Embodiments of the present disclosure will now be described by way of example only with reference to the accompanying schematic drawings of which:

FIG. 3a shows the fold region of the flight control member of FIG. 2;

FIGS. 3b and 3c are magnified views of the hole pattern of FIG. 3a;

FIG. 4b is a magnified view of the hole pattern of the embodiment of FIG. 4a;

DETAILED DESCRIPTION

Figure 1:
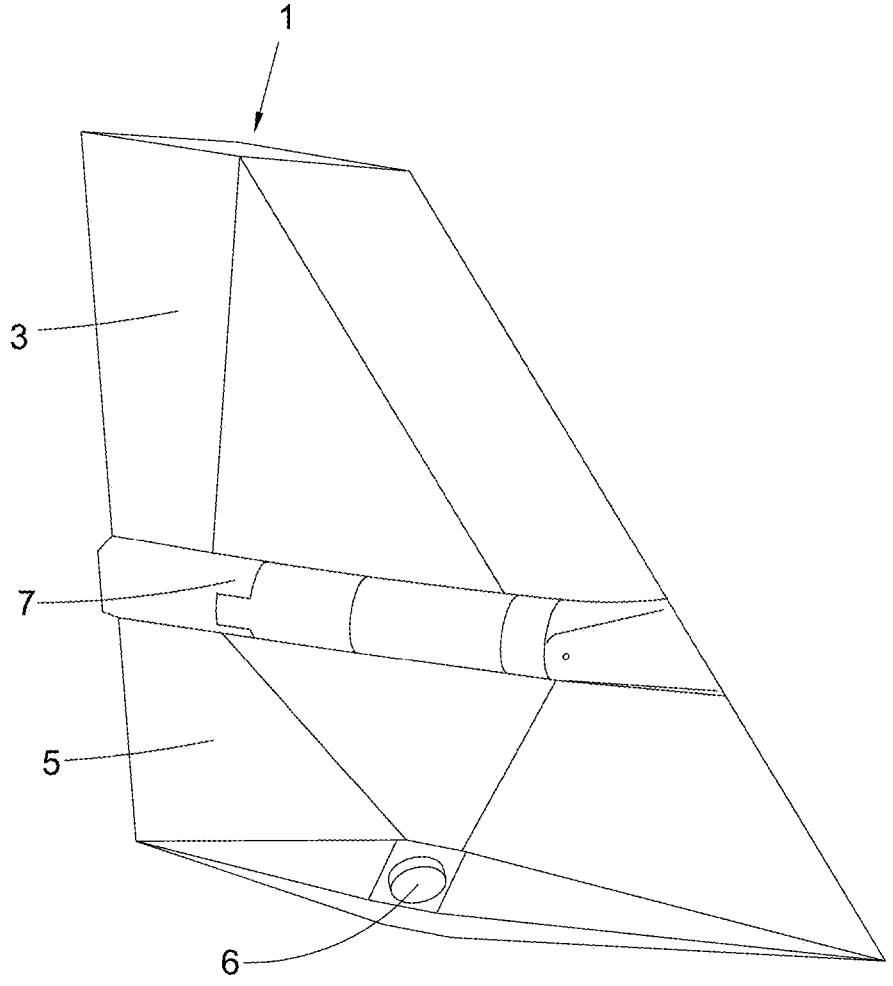
FIG. 1 is a side view of a flight control member according to the prior art.

The present disclosure provides according to a first aspect a foldable moveable member for an air vehicle. The moveable member comprises a sheet. The sheet comprises a first portion, a second portion, and a fold region. The first portion is connected to the second portion via the fold region. The fold region defines a plurality of holes. The presence of the holes means that the stiffness of the fold region is lower than the stiffness of the first or second portion. The fold region forms a continuous surface between the first and second portion, and so the fold region, first portion and second portion together form a continuous surface.

The holes are defined by the shape of the material of the fold region.

The plurality of holes will be of a quantity, and arranged in a pattern, that is sufficient to reduce the stiffness of the fold region so that it is lower than the stiffness of the first or second portion.

The second portion may be configured to be attached (directly or via other structure or structures) to an air vehicle. The air vehicle may be, for example, an aircraft, unmanned air system, unmanned air vehicle, drone, missile, or rocket.

The fold region may be a rectangular region.

The first portion, the second portion, and the fold region may include, or be made substantially or entirely from, a conductor. The first portion, the second portion, and the fold region may comprise, or be made substantially or entirely from a metal, for example aluminium or a metallic alloy, or carbon fibre or composite material. Electrical current may be able to flow from the first portion, through the fold region, and to the second portion. Advantageously this reduces the radar cross-section of the member.

The continuous surface means that it is possible to trace a line from the first portion, through the fold region, and to the second portion. The line may pass around the holes in the fold region, but it is not interrupted or otherwise broken by any holes. In certain embodiments, the line may be straight.

Each hole may form a continuous opening from a first face of the fold region to an opposite, second, face of the fold region. Alternatively, it may be that some or all of the holes do not pass completely through the fold region, but rather are blind holes, i.e. areas in which the thickness of the material of the fold region is reduced, for example to less than 50%, preferably less than 25%, more preferably less than 10% of its average thickness in the areas of the fold region that are not holes.

The fold region forming a continuous surface of certain embodiments of the disclosure advantageously means that when the moveable member is unfolded, and in use, the surface is more aerodynamic, compared with a prior-art moveable member having protruding hinge parts, which in turn reduces turbulence and drag. This improves the efficiency and fuel economy of the air vehicle.

Furthermore, the fold region forming a continuous surface between the first and second portion of certain embodiments of the disclosure advantageously reduces the radar cross section of the air vehicle, compared with a prior-art moveable member having protruding hinge parts.

The fold region may form a hollow skin. The hollow skin may surround a hinge.

When the first portion moves between a first position and a second position, the fold region may elastically deform. Elastic deformation means that the fold region can return to its original, unfolded shape without permanent deformation.

The fold region may be biased to return the first portion to the deployed position. The bias may result from elastic energy stored in the sheet at the fold region. The bias may result from a spring in a hinge mechanism within the fold region.

The fold region may comprise a fold line. When the foldable moveable member folds, the first portion may move relative to the second portion about the fold line. The fold line may be in the centre of the fold region. When folded, the fold region may form a continuous curve.

The plurality of holes may be on average closer to parallel to the fold line than orthogonal to the fold line.

Each hole can be resolved into a length component parallel to the fold line and a length component orthogonal to the fold line. The length component parallel to the fold line of the plurality of holes may be greater than the length component orthogonal to the fold line of the plurality of holes. The sum of the parallel components of all of the holes may be greater than the sum of the orthogonal components. Having the holes generally aligned with the fold line provides reduced stiffness, which is advantageous for folding while limiting any reduction in structural integrity.

The plurality of holes may be arranged in one or more lines, which may be straight lines.

The plurality of holes may form a seamless hinge or joint.

The holes may be elongate. The holes may be linear. The holes may be slits. The holes may be cuts. Advantageously, the holes are sufficiently small that they are invisible to radar, that is, they are sufficiently small that they are transparent to EM surface waves; for example, the holes may be significantly smaller than the wavelength of the EM surface waves. Preferably, the holes are sufficiently small that they do not significantly affect air flow across the surface.

The holes may be defined, or at least partially defined, by a first sheet portion, a second sheet portion and at least two sheet beams. The first sheet portion and/or the second sheet portion may include an apron extending between the beams. The first sheet portion and/or the second sheet portion may include a bridge from the sheet portion to at least one of the beams. The first sheet portion and/or the second sheet portion may include a shoulder between an apron and a beam.

The beams may be parallel to a line about which the fold region is configured to fold. The beams may be perpendicular to a line about which the fold region is configured to fold. The beams may be at an angle to a line about which the fold region is configured to fold. The beams may extend directly from the first sheet portion to the second sheet portion. Alternatively, the beams may extend back from an apron or bridge towards the sheet portion to which they are attached.

Each hole may be defined by a first sheet portion, a second sheet portion, and four sheet beams extending parallel to the first sheet portion and the second sheet portion. The four sheet beams may be arranged in pairs to form two parallel rows of beams. The first sheet portion and the second sheet portion may each include a bridge that joins the respective sheet portion to the row of beams closest to that sheet. A further bridge may join the two rows of beams to each other, for example at a position equidistant from the nearest adjacent bridges, to the sheets.

The holes may be arranged in two, three or more rows parallel to a line about which the fold region is configured to fold.

The plurality of holes may be arranged in a repeating pattern. The repeating pattern may comprise a repeating pattern of tessellated unit cells. Each unit cell may be rectangular in shape. The skilled person will understand that the term 'rectangular' includes squares.

Each unit cell may contain at least two holes. The at least two holes may be interlaced. One hole may be interlaced with another if the smallest rectangle that can be drawn around a first hole overlaps the smallest rectangle that can be drawn around a second hole. For example, the notional rectangle for a linear hole would be the hole itself. The notional rectangle for an 'H' shaped hole would have the end of each arm of the 'H' in a corner of the rectangle, for example. Interlacing the holes may provide advantages in reducing stiffness and improving flexibility.

The plurality of holes may comprise a plurality of round or elliptical holes. The plurality of holes may comprise a plurality of square or rectangular or 6-sided holes. The plurality of holes may comprise a plurality of U-shaped holes.

The plurality of holes may comprise a plurality of "H" shaped holes.

The plurality of holes may be arranged in a pattern having a unit cell. The unit cell may comprise an "H" shaped hole and a pair of longitudinal holes. The pair of longitudinal holes may be interlaced with the 'H' shaped hole.

The unit cell may comprise a 'C' shaped hole, and a pair of arc shaped holes at the perimeter of the unit cell. The pair of arc shaped holes may be interlaced with the 'C' shaped hole.

The foldable moveable member may include a spar, which may be lockable, that is arranged to stiffen the member when it is in an extended configuration. The lock may operate on a hinge within the folding region. The lock may be a sliding sleeve, for example at the edge or edges of the sheet, that can be slid from a locked position, in which it prevents folding of the member to an unlocked position, in which it does not prevent folding of the member.

The foldable moveable member may be an access hatch, a flexible conductive strip, a hinge or a flexible linkage.

The foldable moveable member may be suitable for attachment to a flight control member. The foldable moveable member may be a flight control member. The flight control member may be a wing flap, air brake, fin, aileron, or elevon, for example. The sheet may be the external surface of the flight control member.

The present disclosure provides according to a second aspect a foldable flight control member comprising a sheet. The sheet comprises a first portion, a second portion, and a fold region. The first portion is connected to the second portion via the fold region. The fold region comprises a plurality of holes. The presence of the holes lowers the stiffness of the fold region to be lower than the stiffness of the first or second portion. The fold region forms a continuous surface between the first and second portion.

The present disclosure provides according to a third aspect an air vehicle including a foldable moveable member according to the first aspect of the disclosure or a foldable flight control member according to the second aspect of the disclosure. The air vehicle may be, for example, an aircraft. unmanned aerial vehicle or drone, missile, or rocket.

The present disclosure provides according to a fourth aspect a method of deploying on an air vehicle a foldable movable moveable member or a foldable flight control member. Said foldable movable moveable member or foldable flight control member comprises a sheet. The sheet comprises a first portion, a second portion, and a fold region. The first portion is connected to the second portion via the fold region. The second portion is attached (directly or via other structure or structures) to the air vehicle. The fold region includes a plurality of holes. The fold region, the first portion and the second portion form a continuous surface. The method comprises the step of rotating the first portion relative to the second portion from a stowed position to a deployed position by bending the fold region. The air vehicle itself may be stowed, for example in a canister or on a larger air vehicle (which may be a fixed wing or rotary wing platform), for example in a weapons bay. It may be that the fold region is bent by at least 90 degrees.

The present disclosure draws upon the technique known as kirigami, in which a sheet of material is modified by adding to a region of the sheet a pattern of holes in the form of cuts, recesses or folds. The region where the pattern lies, often called a (surrogate) fold, is more flexible than the unmodified regions because mechanical strain is released through the cut when the material is bent in a specific direction. To ensure that the material has no permanent deformation or damage the material is kept within its elastic limit.

In general the relationship between the geometry of the sheet defining the holes and the fold axis yields the following behaviours: sheet elements perpendicular to the fold axis experience pure bending; sheet elements parallel to the fold axis experience pure torsion; sheet elements at other angles experience a combination (the vector sum) of bending and torsion.

Very many variations of kirigami feature shapes and patterns are possible. Some examples are shown in FIG. 8 (which is based on Table 3.1 of Delimont, Isaac L., "Compliant Joints Suitable for Use as Surrogate Folds" (2014) (available from BYU ScholarsArchive) Each of FIGS. 8 (a) to 8 (e) shows a simple complete hole that forms part of a larger pattern of such holes in a fold region. A first sheet portion and a second sheet portion are joined by beams. The orientation of the beams is rotated in each successive figure, from FIG. 8 (a) in which the beams go directly from the first sheet portion to the second sheet portion, at right angles to both to FIG. 8 (e) in which the beams are at 180 degrees to the FIG. 8 (a) arrangement, again at right angles to both sheets by doubling back on themselves.

In FIG. 8 (a), a sheet 700a includes a kirigami feature comprising a first sheet portion 713a, a second sheet portion 715a and two sheet beams 720 extending between, and perpendicular to, the first sheet portion 713a and the second sheet portion 715a. The first sheet portion 713a, the second sheet portion 715a and the beams 720 together define a plurality of rectangular holes 725a. As the beams 720 are perpendicular to the fold axis (which runs between the first and second sheet portions), the beams 720 experience pure bending when the sheet is folded. When the sheet 700a is under tension perpendicular to the fold axis, the beams 720 are also under tension. When the sheet 700a is under compression, the beams 720 are also under compression.

In FIG. 8 (b), a sheet 700b includes a kirigami feature comprising a first sheet portion 713b, a second sheet portion 715b and two sheet beams 730 extending between, and at a 45 degree angle to, the first sheet portion 713b and the second sheet portion 715b. The first sheet portion 713b and the second sheet portion 715b each include an apron 732 that extends between adjacent beams 730 (the apron on the second sheet portion 715b is only partially visible in FIG. 8). The first and second sheet portions 713b, 715b (including the aprons 732) and the beams 730 together define a plurality of six-sided holes 725b. As the beams 730 are at 45 degrees to the fold axis, they experience mixed torsion, bending and tension when the sheet is folded. When the sheet 700b is under tension perpendicular to the fold axis, the beams 730 are under mixed tension and bending. When the sheet 700b is under compression, the beams 730 are under mixed compression and bending.

In FIG. 8 (c), a sheet 700c includes a kirigami feature comprising a first sheet portion 713c, a second sheet portion 715c and two sheet beams 740 extending parallel to the first sheet portion 713c and the second sheet portion 715c. The first sheet portion 713c and the second sheet portion 715c each includes a bridge 742 that joins the respective sheet portion to the beams 740 (the bridge 742 on the second sheet portion 715c is only partially visible in FIG. 8). The bridges 742 alternate in joining the beams 740 to the first sheet 713c or the second sheet 715c. The first and second sheet portions 713c, 715c (including the bridges 742) and the beams 740 together define a plurality of rectangular holes 725c. As the beams 740 are parallel to the fold axis, they experience pure torsion when the sheet is folded. When the sheet 700c is under tension or compression perpendicular to the fold axis, the beams 740 are under fixed-clamped bending.

In FIG. 8 (*d*), a sheet 700d includes a kirigami feature comprising a first sheet portion 713d, a second sheet portion 715d and two sheet beams 750 extending between, and at a 45 degree angle to, the first sheet portion 713d and the second sheet portion 715d. The first sheet portion 713d and the second sheet portion 715d each include an apron 752 that extends transversely between adjacent beams 750 (the apron on the second sheet portion 715d is only partially visible in FIG. 8). The arrangement of FIG. 8 (*d*) differs from the arrangement of FIG. 8 (*b*) because the aprons 752 are larger in the direction perpendicular to the fold axis, such that they overlap. The beams 750 therefore extend from each apron 752 in a direction back towards the sheet portion 713d, 715d to which that apron 752 is attached. The first and second sheet portions 713d, 715d (including the aprons 752), the second sheet portion 715d and the beams 750 together define a plurality of substantially u-shaped holes 725d. As the beams 750 are at 45 degrees to the fold axis, they experience mixed torsion, bending and tension when the sheet is folded. When the sheet 700d is under tension perpendicular to the fold axis, the beams 750 are under mixed compression and bending. When the sheet 700d is under compression, the beams 750 are under mixed tension and bending.

In FIG. 8 (*e*), a sheet 700e includes a kirigami feature comprising a first sheet portion 713e, a second sheet portion 715e and two sheet beams 760 extending between, and perpendicular to, the first sheet portion 713e and the second sheet portion 715e. The first sheet portion 713e and the second sheet portion 715e each include an apron 762 that extends between adjacent beams 760 (the apron on the second sheet portion 715e is only partially visible in FIG. 8). The arrangement of FIG. 8 (*e*) differs from the arrangement of FIG. 8 (*a*) because of the presence of the aprons 762 and because they are sufficiently large, in the direction perpendicular to the fold axis, to overlap. The beams 760 therefore extend back from each apron 762, parallel to the lateral edges of the apron 762 and back towards the sheet portion 713d, 715d to which that apron 762 is attached. A shoulder portion 765 at the end of the apron 762 ensures that the beam 760 is spaced apart from the apron 762. The first and second sheet portions 713e, 715e (including the aprons 762 and the shoulder portions 765), the second sheet portion 715e and the beams 760 together define a plurality of rectangularly u-shaped holes 725e. As the beams 760 are at right angles to the fold axis, they experience pure bending when the sheet is folded. When the sheet 700e is under tension perpendicular to the fold axis, the beams 760 are under compression. When the sheet 700e is under compression, the beams 760 are under tension.

Whilst many different kirigami features can provide the fold region of reduced stiffness with which the present disclosure is concerned, the following discussion is of a structure of the class shown in FIG. 8 (*c*), i.e. a structure in which the beams 740 are parallel to the fold axis (a "torsion-parallel" structure). A torsion-parallel kirigami feature is a good choice for an application such as a folding fin, because it can enable relatively large fold angles, compared with the other illustrated structures. A torsion-parallel joint has a relatively low stiffness, so it can be deflected with application of a relatively small force.

Figure 9:
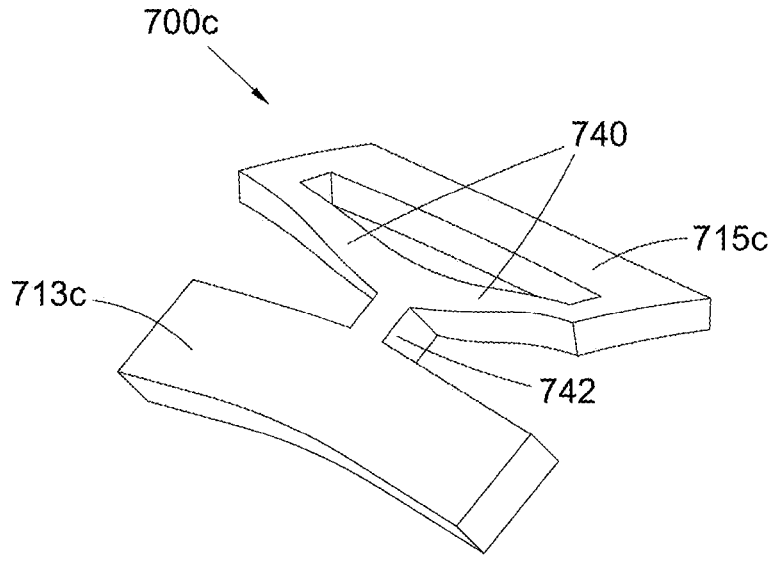
FIG. 9 is a modelled perspective view of the hole arrangement of FIG. 8 (c) when bent.

FIG. 9 shows the torsion-parallel structure 700c of FIG. 8 (*c*) being bent. First portion 713c and bridge 742 have been rotated out of the plane of the second portion 715c, resulting in torsion, in particular in the beams 740.

However, bending of a torsion-parallel structure induces a relatively high amount of stress. To achieve a desired fold angle in practice it may be advantageous to arrange a plurality of the torsion-parallel structure features in series (that is, in successive rows parallel to the fold axis).

Figure 10B:
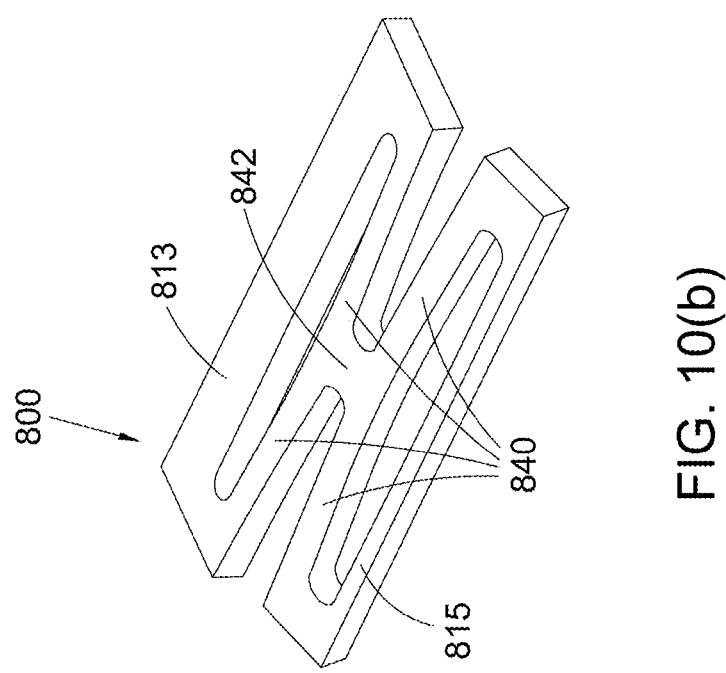
FIG. 10 is (a) a close-up of a further example design of hole for the fold region, (b) a modelled perspective view of the hole arrangement when bent and (c) a fin incorporating a plurality of the holes in its fold region.
Figure 10A:
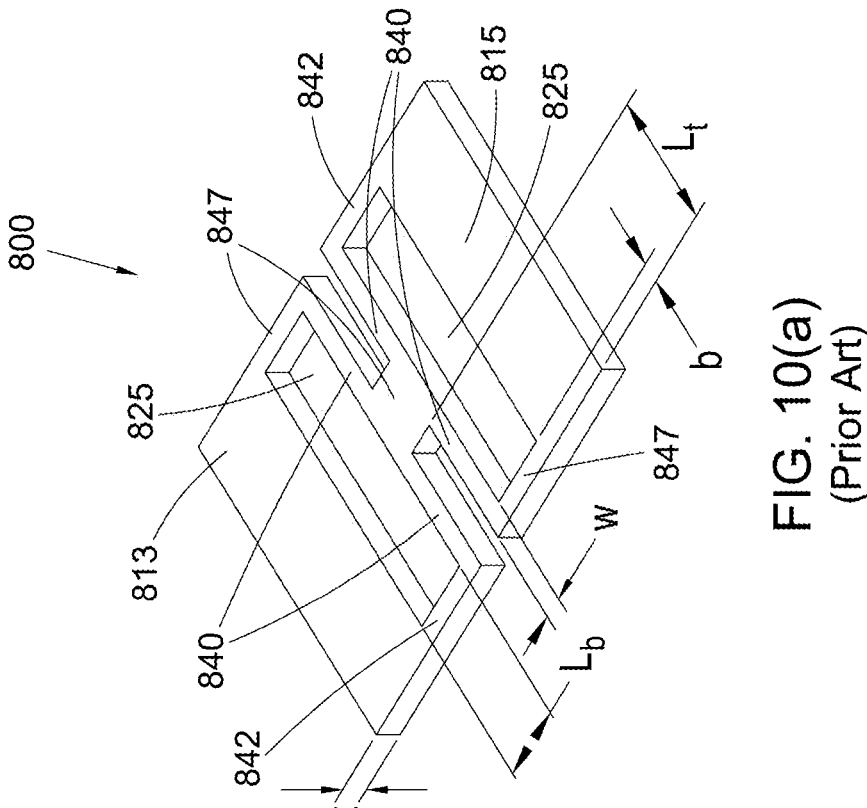
Figure 10C:
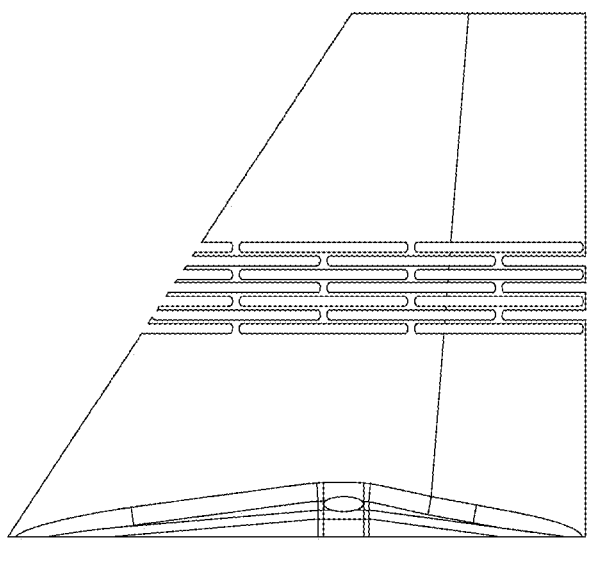

In FIG. 10 (*a*), a sheet 800 includes a kirigami feature comprising a first sheet portion 813, a second sheet portion 815, and four sheet beams 840 extending parallel to the first sheet portion 813 and the second sheet portion 815. The four sheet beams 840 are arranged in pairs to form two parallel rows of beams. The first sheet portion 813 and the second sheet portion 815 each includes a bridge 842 that joins the respective sheet portion to the row of beams 840 closest to that sheet (the bridges 842 from the first and second sheet portions 813, 815 are only partially visible in FIG. 10). A further bridge 847 joins the two rows of beams 840 to each other, in this example at a position equidistant from the nearest adjacent bridges 842 to the sheets 813, 815. The first and second sheet portions 813, 815 (including the bridges 842, 847) and the beams 840 together define a plurality of rectangular holes 825 arranged in three parallel rows. The behaviour on bending of the feature 800 (FIG. 10 (*b*) is similar to that of the simple torsion-parallel structure feature 700c (FIG. 9), but the torsion now occurs over twice as many beams 840 and so the stress is more distributed.

It will be understood that the kirigami features can be repeated, either in series, to distribute stress as just discussed, or along the fold direction, or both. FIG. 10 (*c*) shows an example fin including the structure of FIG. 10 (*a*) arranged in a pattern that repeats both in series (perpendicular to) across the fold and along (parallel to) the fold.

The inventors have found that the dimensions of the beams 840 have a significant effect on the behaviour of the torsion-parallel structure. With reference to FIG. 10 (*a*), reducing the thickness (t) and width (w) of the beams 840 decreases the stiffness of the sheet, so it may be preferable for them to be thin as they can be made without compromising the structural integrity of the sheet. Increasing the length Lt of the beams 840 decreases the stiffness of the sheet, and so it may be preferable for them to be as long as they can be made without compromising the structural integrity of the sheet (for example more than 50 times, more than 80 times or more than 100 times the thickness). Of course, the material from which the feature is made should also be able to withstand high levels of strain whilst staying within the elastic limit. As discussed above, adding more kirigami features in series distributes stress across the extra beams 840.

Figure 2:
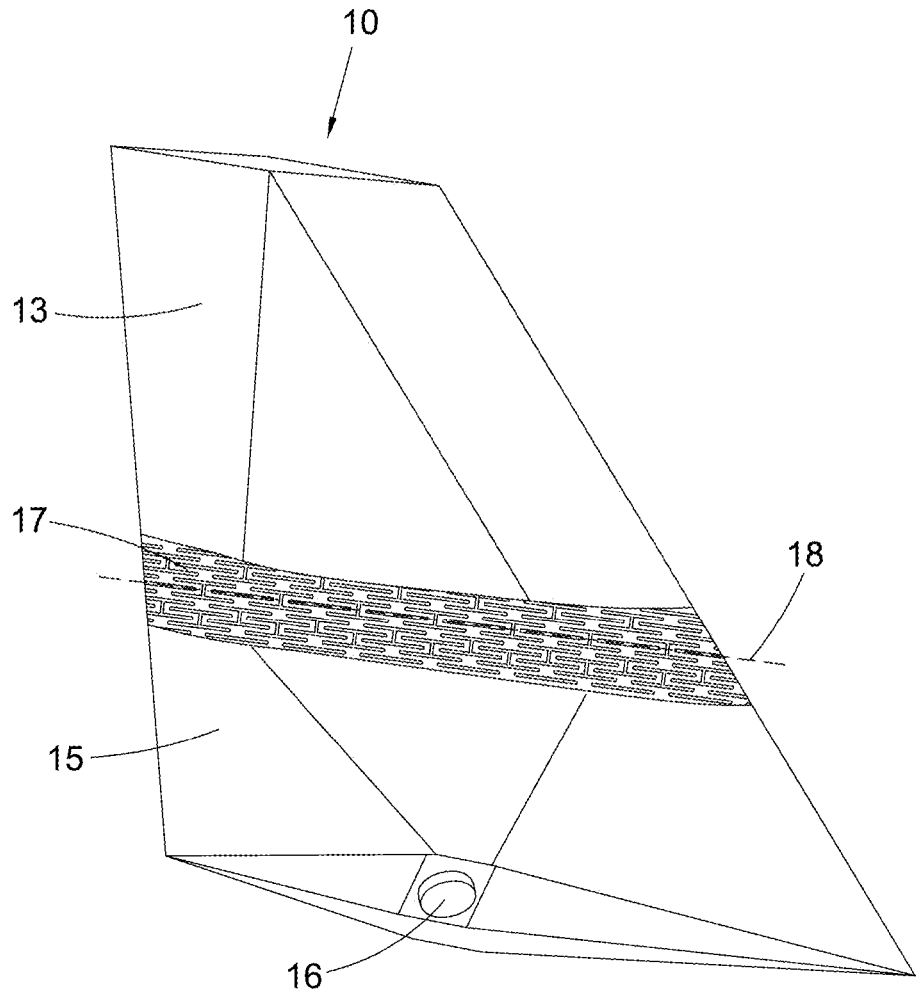
FIG. 2 is a side view of a flight control member according to an embodiment of the present disclosure.

Turning now to FIG. 2 an example embodiment of the present disclosure provides a flight control member 10 is similar to the flight control member 1 of FIG. 1 in that it comprises a first portion 13 and a second portion 15.

A key difference is that connecting the first portion 13 and the second portion 15 is a fold region 17. The fold region 17 is part of the same sheet that makes up the surface of the first part 13 and the surface of the second part 15. In this way, the fold region 17 forms a continuous surface between the first portion 13 and the second portion 17.

Figure 5:
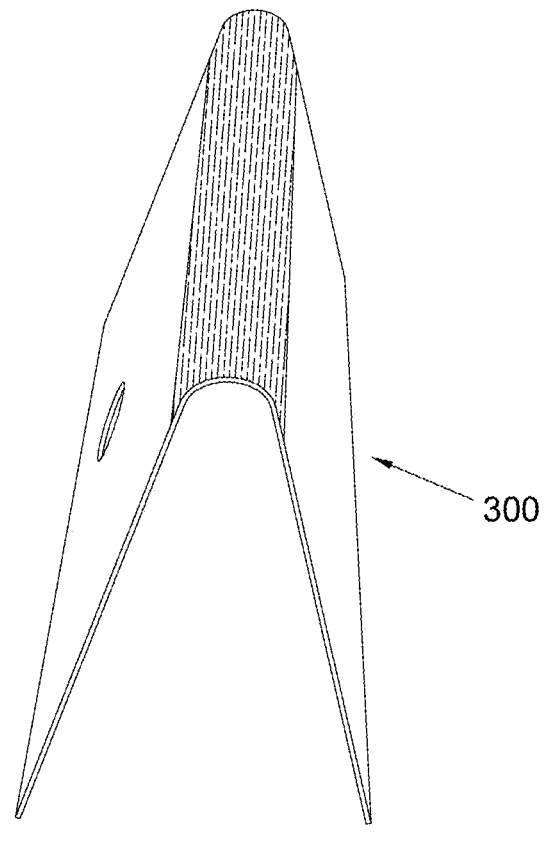
FIG. 5 shows a metal sheet folded along a fold region.

The fold region 17 is shown with a regular area defined by a pattern of holes (shown in more detail in FIG. 3). This pattern of holes reduces the stiffness of the fold region 17. The reduced stiffness of the fold region 17 allows the flight control member to fold about the fold line 18 such that fold region 17 bends in a continuously curved shape. (FIG. 5 shows a metal sheet 300 bent in that manner.) The fold line 18 is located in the centre of the fold region 17. When folded, the fold line 18 is located at the apex of the curved fold region 17.

The second portion 15 is mounted to an air vehicle (not shown) by means of bolts 16.

The flight control member 10 is made of metal. Each of the first portion 13, the fold region 17, and the second portion 15 are made of metal. Electrical current is capable of flowing from the first portion 13, through the fold region 17, and into the second portion 15.

While the embodiment of FIG. 2 does not show a hinge, in embodiments, there may still be a hinge but the hinge may be covered by the sheet, which includes the fold region, the surface of the first portion, and the surface of the second portion. This still provides the same benefits of reduced radar cross section and reduced turbulence and drag.

Thus, in embodiments, a foldable moveable member is provided that has a first portion, a fold region, and a second portion, wherein the foldable moveable member is for attaching to a flight control member. In embodiments, the foldable moveable member includes a sheet, which comprises the first portion, the fold region, and the second portion. The foldable moveable member and/or the sheet of the foldable moveable member may be attached and/or attachable to a flight control member 1 such that the first portion covers the first part, the fold region covers the hinge, and the second portion covers the second part.

Figures 3A, 3B, 3C:
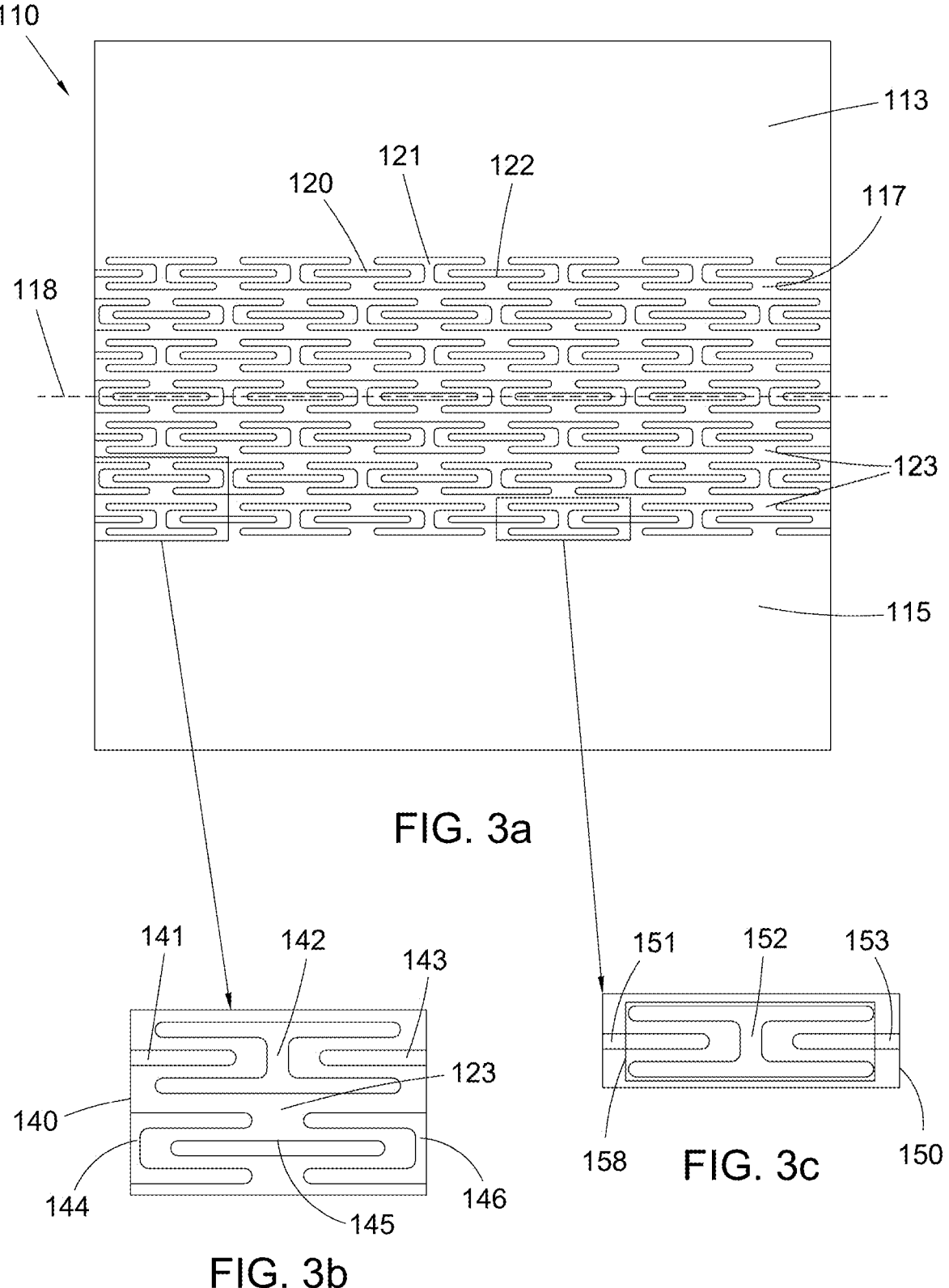

FIG. 3a shows a foldable moveable member 110 according to an embodiment of the present disclosure. The foldable moveable member 110 is suitable for attaching to a flight control member (not shown, but such as the member 1 in FIG. 1 for example).

The foldable moveable member 110 comprises a first portion 113, a fold region 117, and a second portion 115. The fold region 117 comprises a plurality of holes 120, 121, 122. The plurality of holes 120, 121, 122 reduces the stiffness of the fold region 117 such that the foldable moveable member 110 can bend and fold about the fold line 118. The fold line 118 is located in the centre of the fold region 117.

Each of the first portion 113, the fold region 117, and the second portion 115 are made of metal, such that electrical current can flow from the first portion 113, through the fold region 117, and into the second portion 115.

The plurality of holes is formed by a repeating pattern of linear holes 120, 122 and 'H' shaped holes 121 in a direction parallel to the fold lie 118. Each linear hole 120, 122 is interlaced with (i.e. extends into the arms of) an adjacent 'H' shaped hole 121 in a direction parallel to the fold line 118. This linear column of repeating linear 120 and 'H' shaped 121 holes is duplicated multiple times (seven times in FIG. 3a) to form the fold region 117.

There are also multiple columns 123 in the fold region 117 that have a line running parallel to the fold line 118 that is uninterrupted by holes. These columns 123 have the benefit of maintaining a relatively high level of stiffness against bending of the member 110 in the direction orthogonal to the fold line 118, whilst simultaneously allowing reduced stiffness of the fold region 117 when bending about the fold line 118. This maintains structural integrity of the foldable moveable member 110.

FIGS. 3b and 3c show hole patterns according to an embodiment of the present disclosure. FIG. 3b shows substantially the same hole pattern as FIG. 3c, but with a different definition of the unit cell. FIG. 3b shows a unit cell 140. The unit cell 140 includes an 'H' shaped hole 142, a linear hole 145, two halves of another linear hole 141, 143, and two halves of an 'H' shaped hole 144, 146.

Stacking the unit cell 140 side-by-side parallel to the fold line creates a pair of repeating columns of linear holes 141, 143, 145 and 'H' shaped holes 142, 144, 146. The unit cell 140 also includes a column 123 in the middle of the unit cell which runs parallel to the fold line 118, and is uninterrupted by any of the holes.

The unit cells 140 are also stacked above and below each other to generate multiple columns of repeating patterns of alternating linear 120 and 'H' shaped 121 holes, as shown in the fold region 117 of FIG. 3a.

FIG. 3c shows a rectangular unit cell 150 according to an embodiment of the present disclosure. The unit cell 150 is an oblong. The unit cell includes an 'H' shaped hole 152 and two halves of a linear hole 151, 153. Each of the half linear holes 151, 153 are interlaced with the 'H' shaped hole 152.

The unit cell 150 is approximately half the size of the unit cell 140. The unit cell 150, in order to be arranged in the same pattern as shown in the fold region 117, is placed in a repeating pattern side-by-side, and each column is duplicated. However, each duplicate column of repeating unit cells is shifted by half a unit cell relative to each adjacent column, to arrive at the pattern shown in the fold region 117.

Either the unit cells 140 of FIG. 3b, or the unit cells 150 of FIG. 3c can be tessellated to arrive at the pattern shown in the fold region 117 in FIG. 3a.

Each of the half linear holes 151, 153 are interlaced with the 'H' shaped hole 152. The 'H' shaped hole 152 is shown with a notional minimal rectangle 158 tightly fitted around the 'H' shape. Each of the half linear hole 151, 153 falls within the notional rectangle 158, and are therefore interlaced with the 'H' shaped hole 152.

In embodiments of the present disclosure, alternative patterns are possible within the unit cell. For example, the pattern within the fold region may comprise a plurality of tessellated 'H' shaped holes. The unit cell may comprise an 'H' shaped hole and four quarters of an 'H' shaped hole.

The holes 151, 152, 153 in the unit cells 150 are on average closer to parallel to the fold line 118 than orthogonal to the fold line 118. This can be determined by resolving each hole in a direction parallel to the fold line 118 and in a direction orthogonal to the fold line 118. It is clear from the arrangement of the holes in the unit cell 150 that the only orthogonal component comes from the middle part of the 'H' shaped hole 152. All other components are parallel to the fold line 118, and are much greater in total length. Therefore the holes in the unit cell 15 are on average closer to parallel to the fold line 118 than orthogonal to the fold line 118. Since the fold region 117 is made up of unit cells 150, the plurality of holes in the fold region 117 are also on average closer to parallel to the fold line 118 than orthogonal to the fold line 118.

Figure 4A:
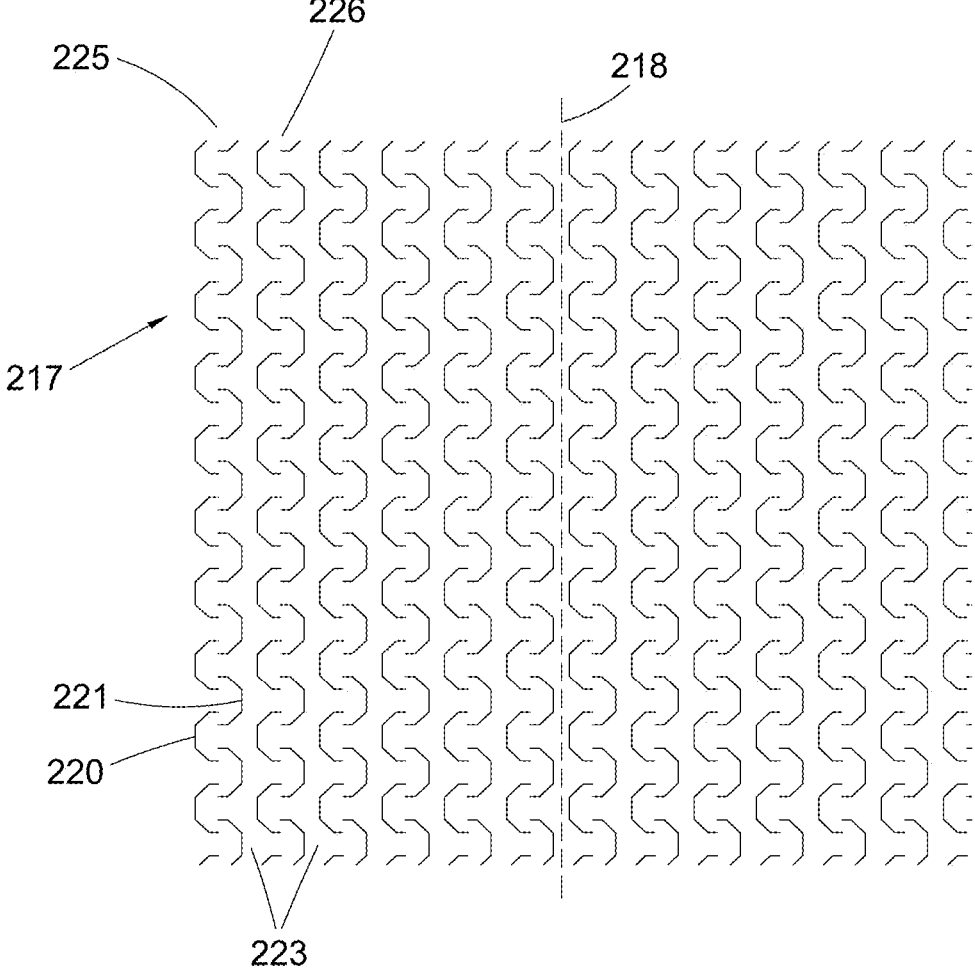
FIG. 4a shows a fold region pattern according to a second embodiment of the present disclosure.

FIG. 4a shows a fold region 217 according to an embodiment of the present disclosure.

The fold region 217 has a fold line 128. Each column 225, 226 is made of a repeating pattern of 'C' shaped holes 220, 221. Each first 'C' shaped hole 221 is a mirror image of each second 'C' shaped hole 220.

Each 'C' shaped hole 220, 221 is interlaced with (has its ends between the ends of) each adjacent 'C' shaped hole, to form the columns 225, 226. Each column 225, 226, of holes is separated by a column 223 that runs parallel to the fold line 218 and is uninterrupted by any holes. The columns 225, 226 are repeated as often as necessary to form the fold region 217.

Figure 4B:
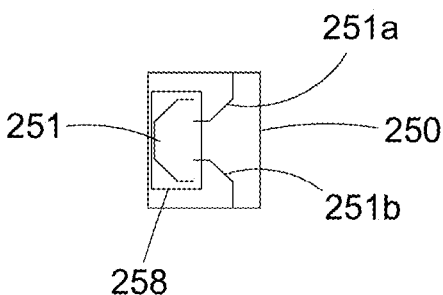

FIG. 4b shows a unit cell 250, showing a hole pattern according to an embodiment of the present disclosure.

The unit cell includes a 'C' shaped hole 251 and a pair of half 'C' shaped holes 251a, 251b, each interlaced with the 'C' shaped hole 251. A notional rectangle 258 is shown tightly fit around the 'C' shaped hole 251. Each of the half 'C' shaped holes 251a, 251b falls within the notional rectangle 258 and are therefore interlaced with the 'C' shaped hole 251.

The unit cell 250 is repeated and placed one above the other to form a column 225 of repeating unit cells. Each column of repeating unit cells 250 is duplicated to form multiple columns 225, 226, which forms the fold region 217.

The person skilled in the art will appreciate that the hole patterns shown in embodiments of the present disclosure are not the only hole patterns that enable a fold region of lower stiffness and which forms a continuous surface. The person skilled in the art will appreciate that the hole pattern may be an arrangement of linear holes for example. The hole pattern may be an arrangement of tessellated 'X' shaped holes, for example. The hole pattern may be an irregular pattern of holes or the holes may be of a plurality of different shapes and sizes.

Looking at the unit cell 250, the holes are on average closer to parallel to the fold line 218 than orthogonal to the fold line 218. The sum of all of the vertical components of each hole 251, 251a, 251b is greater than the sum of all of the horizontal components of each hole 251, 251a, 251b. Since the fold region 217 is comprised of repeating unit cells 250, the plurality of holes in the fold region are also on average closer to parallel to the fold line 218 than orthogonal to the fold line 218.

In another example embodiment of the disclosure (FIG. 6), a missile fin 410 includes a first portion in the form of a solid fin tip 413 and a second portion in the form of a solid fin base 415. A fold region in the form of a hollow skin 417 extends between the fin tip 413 and the fin base 415. The skin 417 includes a plurality of elongate holes that create a continuous, foldable kirigami surface. The skin 417 is electrically and aerodynamically smooth; i.e. the holes are sufficiently small for the electrical conductivity of the surface to remain good and for there to be little effect on air flow across the skin 417 in use.

Figure 6:
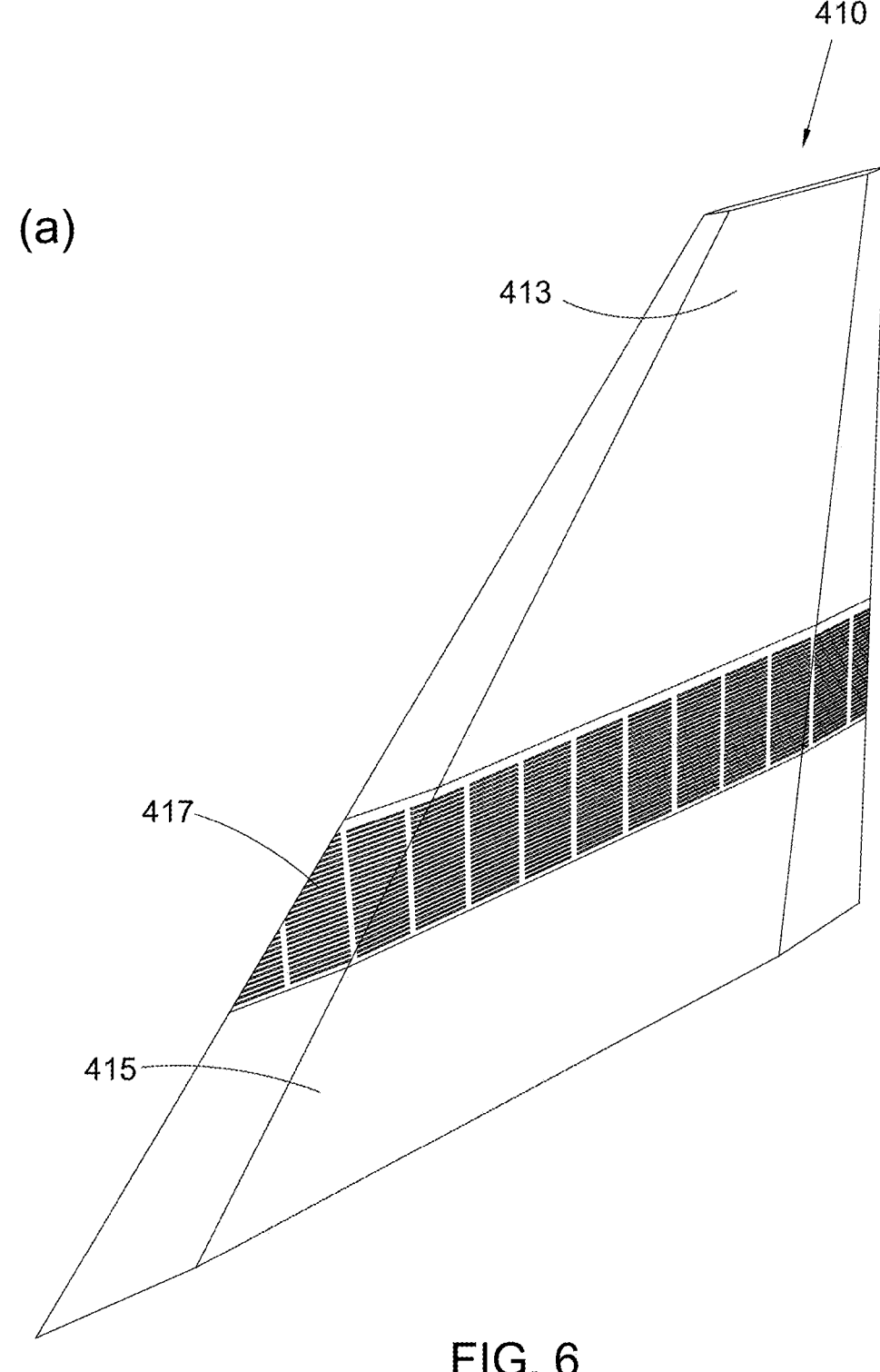
FIG. 6 is (a) a fin according to a third embodiment of the present disclosure, and the fin with the skin removed from its fold region in (b) its deployed configuration and (c) its stowed configuration.
Figure 6:
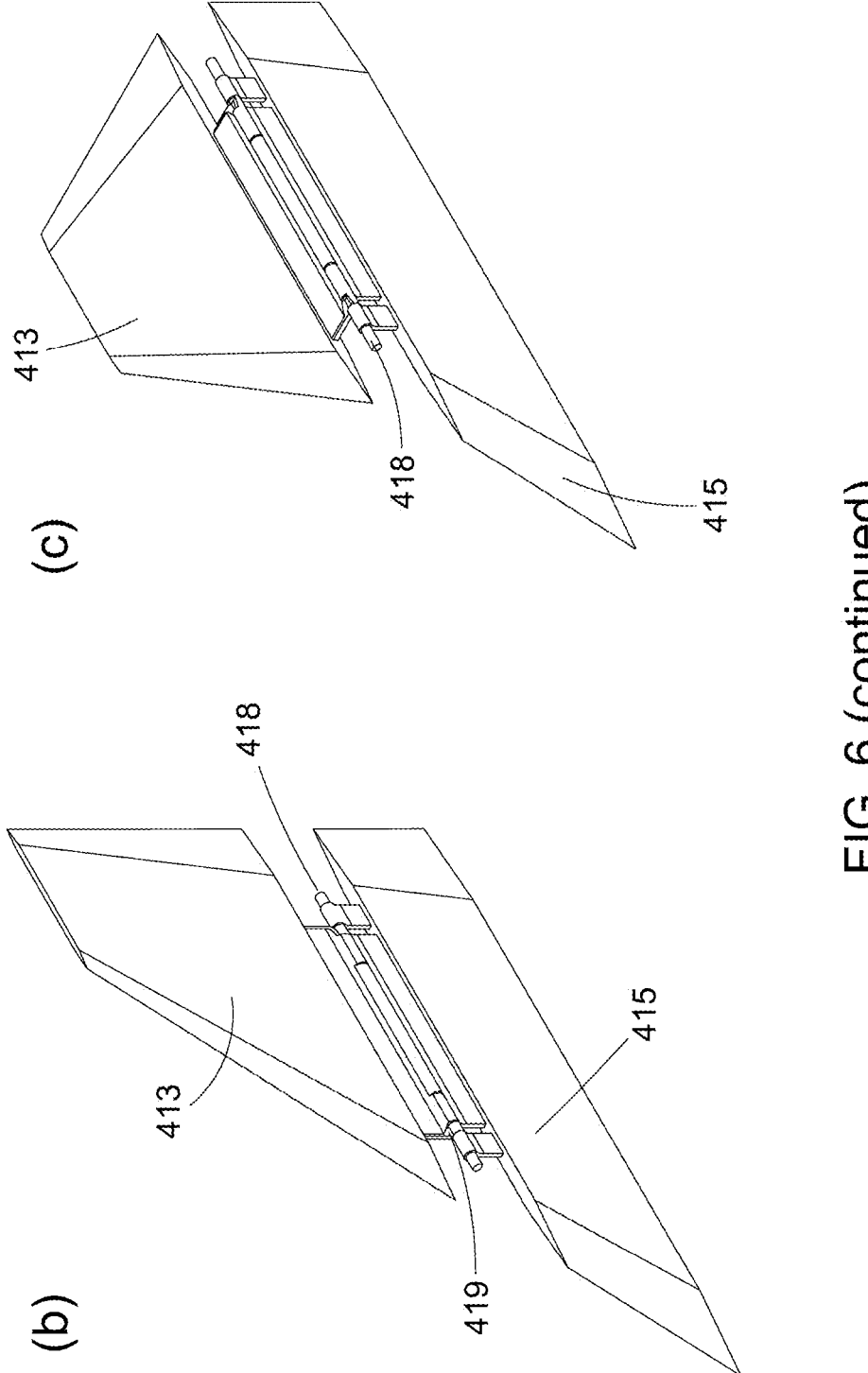

The skin 417 covers a hinge 418 that extends between the fin tip 413 and the fin base 415 (FIG. 6 (b), from which the skin 417 has been omitted in order to show the hinge 418). The hinge 418 incorporates a locking mechanism in the form of a wedge 419 In FIG. 6 (b), the hinge 418 is locked by the wedge 419 so that that the fin tip 413 is locked in a deployed position, in which it is coplanar with the fin base 415. In FIG. 6 (c), the hinge 418 has been unlocked and the fin tip 413 has been rotated about the hinge 418 by 90 degrees into a stowed position, in which it is perpendicular to the plane of the fin base 415.

In the stowed position, elastic energy is stored in the skin 417 such that the skin is biased to return to the deployed position when the missile is released from a confined space (e.g. a canister or weapons bay). The hinge 418 also includes a torsion spring (not shown), biased towards the deployed position, to provide further opening torque.

Figure 7:
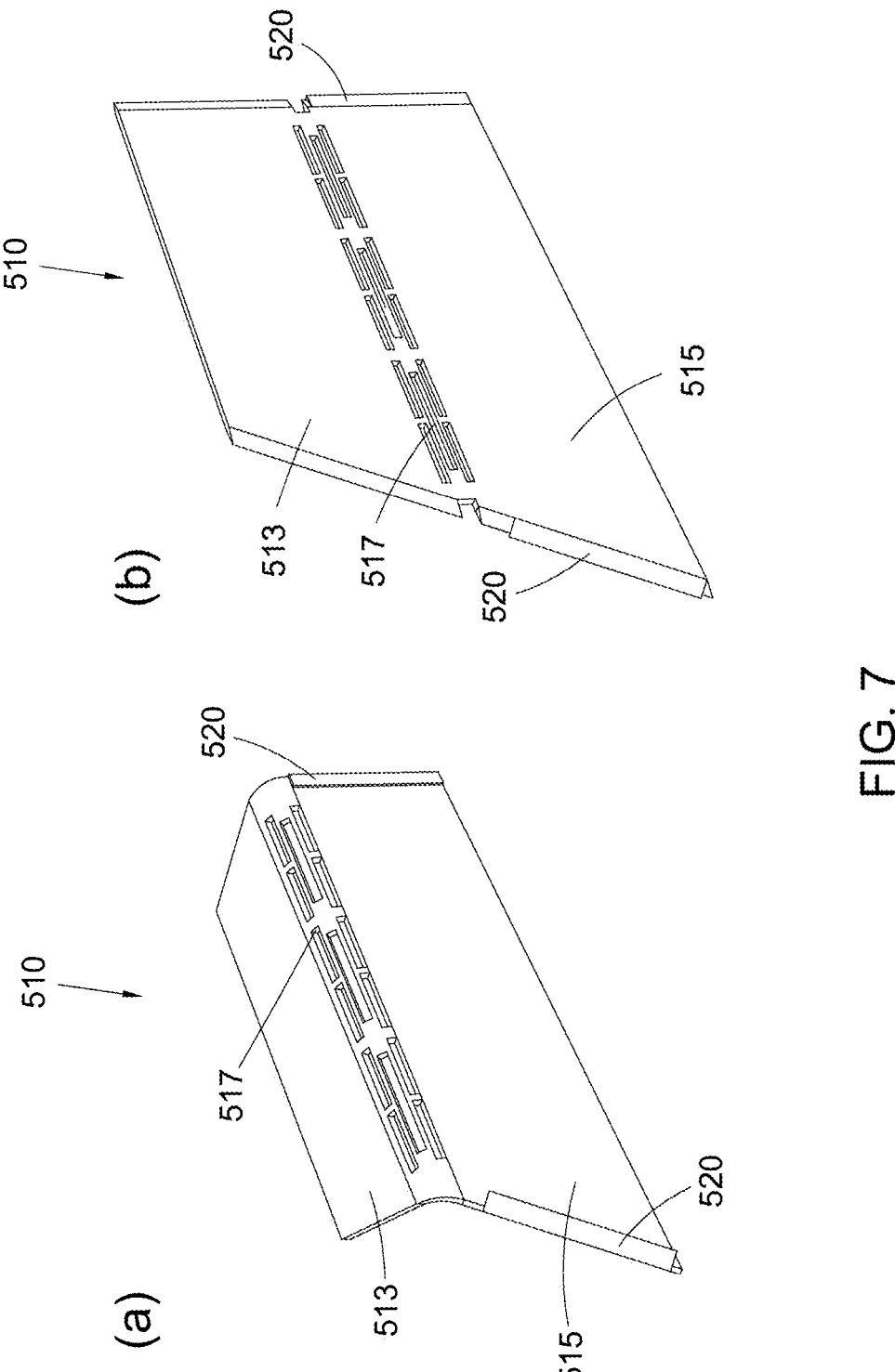
FIG. 7 is a mini-missile fin according to a fourth embodiment of the present disclosure in (a) a stowed configuration, (b) a deployed configuration and (c) a locked configuration.
Figure 7:
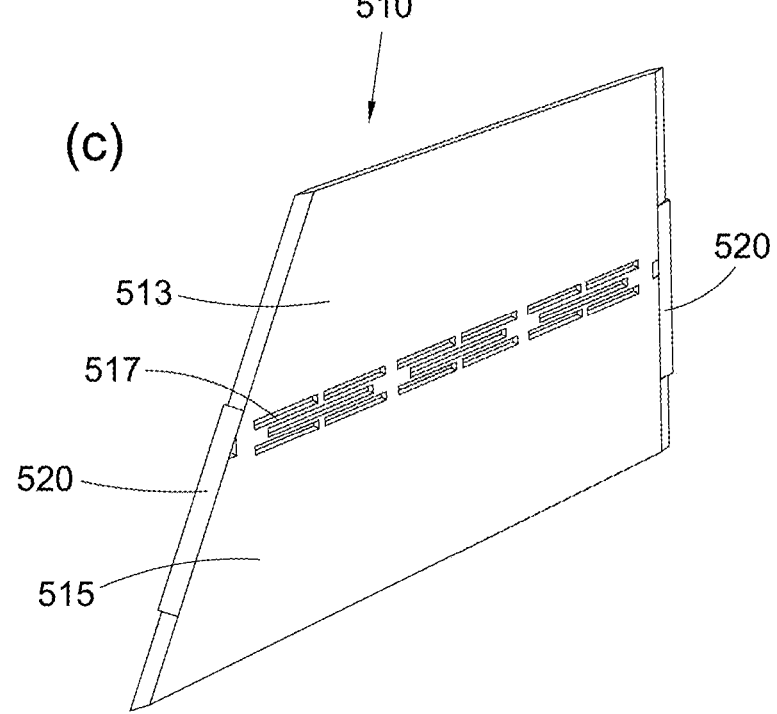
Figure 8A:
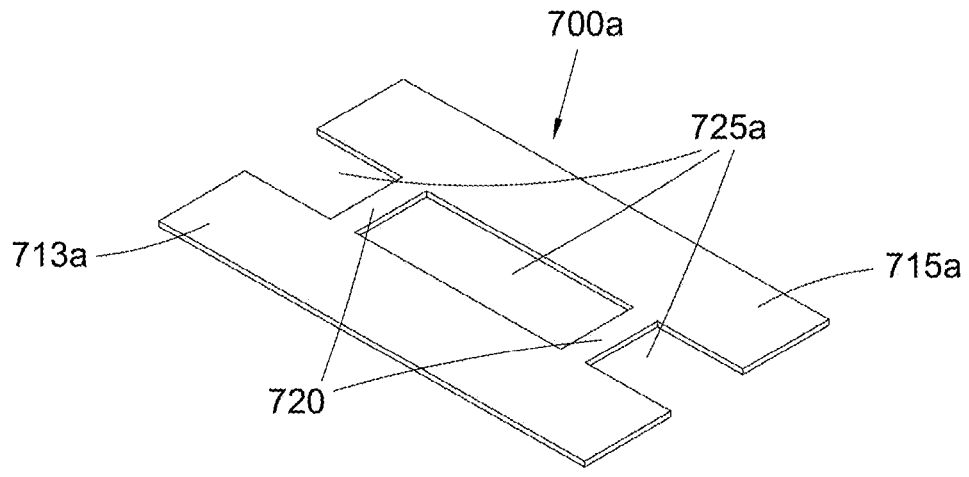
FIG. 8 is close-ups of five example designs of hole for the fold regions of example embodiments, with (a) to (e) having increasing angle of beams relative to first and second portions of the sheet.
Figure 8B:
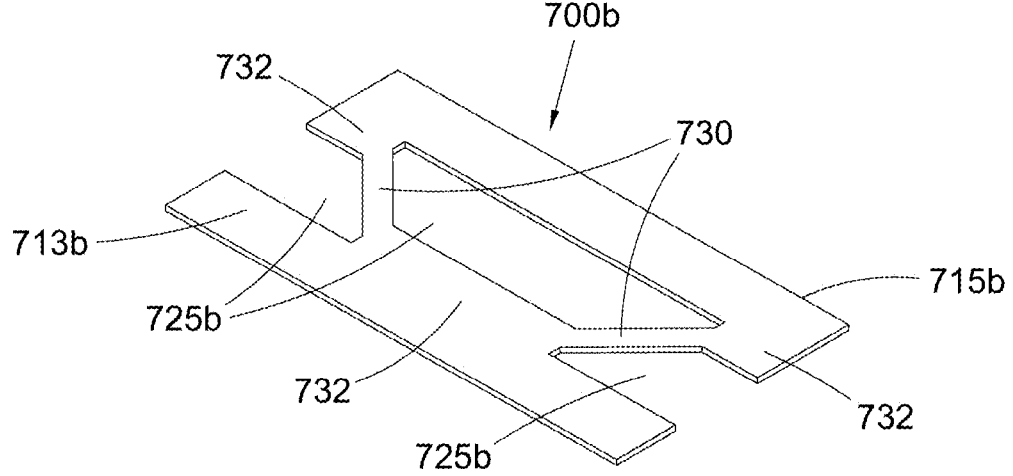
Figure 8C:
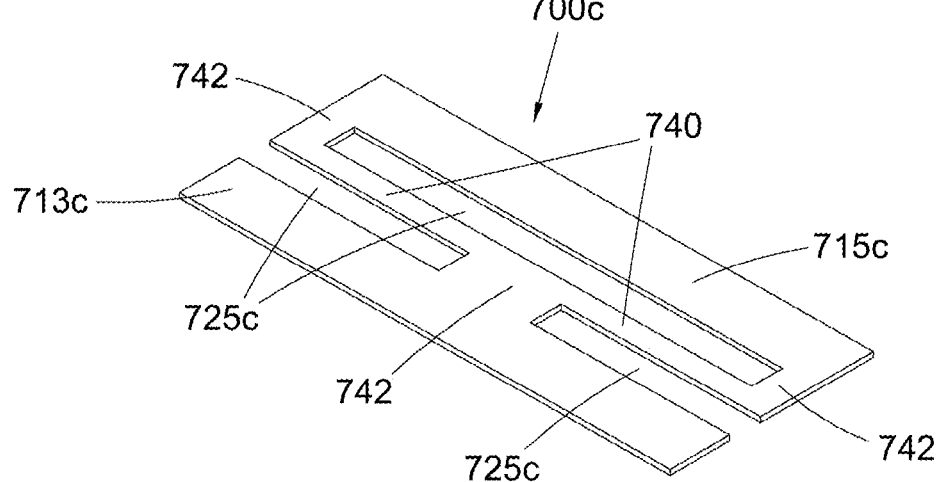
Figure 8D:
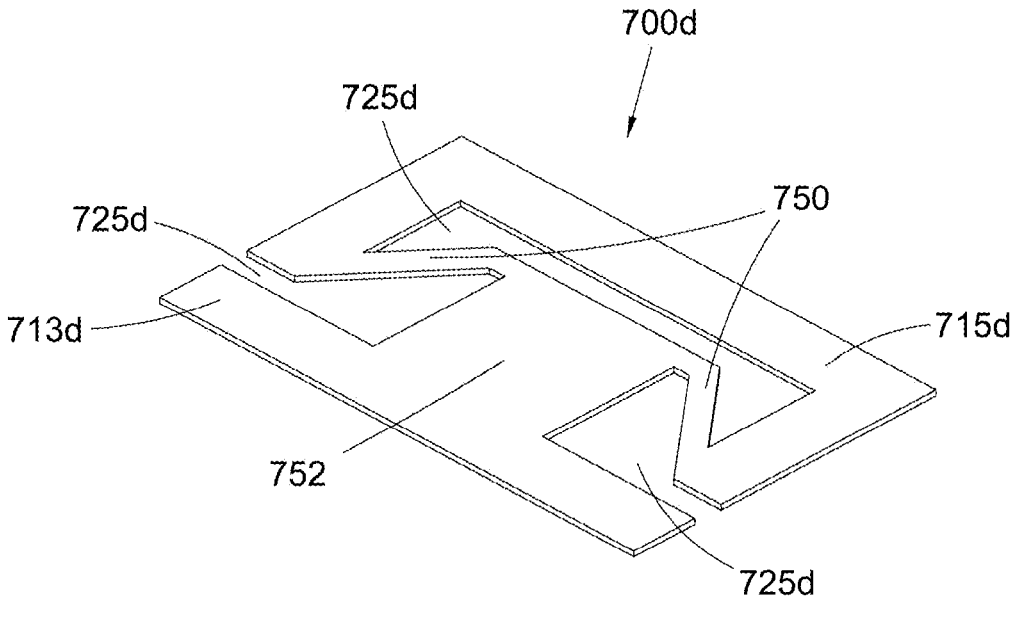
Figure 8E:
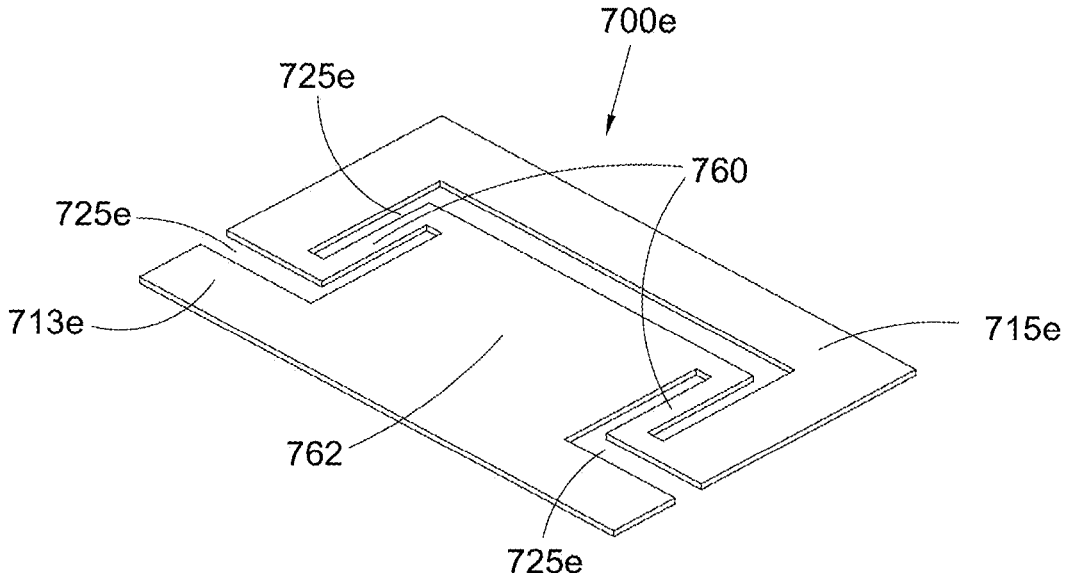

Whereas FIG. 6 shows a fin with an external skin around an internal hinge with an internal locking mechanism, FIG. 7 shows an alternative mechanism in which the fold region acts as a hinge and is locked externally. The fin 510 in FIG. 7 is a mini-missile style fin. The fin tip 513, the fin base 515 and the fold region 517 are together formed by a solid sheet, the stiffness of which is reduced in the fold region 517 by a plurality of elongate holes. The two lateral edges of the fin 510 are each provided with a sliding locking mechanism in the form of a u-shaped sleeve 520 that extends over the edges of the sheet. In the stowed position (FIG. 7 (a)), the U-shaped sleeves 520 are on the edges of the fin base 515 and do not extend to the edges of the fold region 517, which is folded to 90 degrees, so that the fin tip 513 forms a right angle with the fin base 515. In the deployed position (FIG. 7 (b)), the fold region is straightened so that the fin tip 513 is aligned with the fin base 515. In the locked position, the U-shaped sleeves 520 is translated by an actuator (not shown) along the edge of the sheet and over the edges of the fold region 517 to stiffen the fold region 517 and lock the fin 510 in the deployed position.

Whilst the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

It should be noted that throughout this specification, "or" should be interpreted as "and/or".

The invention claimed is:

1. A foldable flight control member comprising a sheet, the sheet comprising:
   a first portion,
   a second portion, and
   a fold region, wherein:
   the first portion is connected to the second portion via the fold region, wherein the fold region comprises a fold line, such that when the foldable moveable member folds, the first portion moves relative to the second portion about the fold line, the fold region defining a plurality of elongate holes such that the stiffness of the fold region is lower than the first or second portion, wherein each elongate hole is resolved into a first length component parallel to the fold line and a second length component orthogonal to the fold line, wherein the first length component parallel to the fold line is greater than the second length component orthogonal to the fold line, and
   the fold region, the first portion and the second portion form a continuous surface.

2. The foldable flight control member as claimed in claim 1, wherein the plurality of holes are arranged in a repeating pattern.

3. The foldable flight control member as claimed in claim 2, wherein the repeating pattern comprises a repeating pattern of tessellated unit cells.

4. The foldable flight control member as claimed in claim 3, wherein each unit cell is rectangular in shape.

5. The foldable flight control member as claimed in claim 3, wherein each unit cell contains at least two holes.

6. The foldable flight control member as claimed in claim 5, wherein the at least two holes are interlaced.

7. The foldable flight control member as claimed in claim 3, wherein a unit cell of the tessellated unit cells comprises an "H" shaped hole and a pair of longitudinal holes.

8. The foldable flight control member as claimed in claim 3, wherein a unit cell of the tessellated unit cells comprises a "C" shaped hole, and a pair of arc shaped holes at the perimeter of the unit cell.

9. The foldable flight control member as claimed in claim 1, wherein the plurality of holes comprises a plurality of "H" shaped holes.

10. The foldable flight control member as claimed in claim 1, wherein the holes are at least partially defined by a first sheet portion, a second sheet portion and at least two sheet beams.

11. The foldable flight control member as claimed in claim 1, wherein electrical current can flow from the first portion, through the fold region, and to the second portion.

12. An air vehicle including a foldable flight control member as claimed in claim 1.

13. A method of deploying, on an air vehicle, foldable flight control member comprising a sheet, the sheet comprising:

a first portion, a second portion, and a fold region, wherein the fold region comprises a fold line, such that when the foldable member folds, the first portion moves relative to the second portion about the fold line, wherein:

the first portion is connected to the second portion via the fold region, the fold region includes a plurality of elongate holes, wherein each elongate hole is resolved into a first length component parallel to the fold line and a second length component orthogonal to the fold line, wherein the first length component parallel to the fold line is greater than the second length component orthogonal to the fold line, and the fold region, the first portion and the second portion form a continuous surface, the method comprising the step of:

rotating the first portion relative to the second portion from a stowed position to a deployed position by bending the fold region.

* * * * *